US011731120B1

(12) United States Patent
Fathi et al.

(10) Patent No.: US 11,731,120 B1
(45) Date of Patent: Aug. 22, 2023

(54) LOBULAR CATALYST STRUCTURE AND REACTOR FOR HYDROCARBON CONVERSION BY HOT AND COMPRESSED WATER BASED PROCESSES

(71) Applicant: SAUDI ARABIAN OIL COMPANY, Dhahran (SA)

(72) Inventors: Mazin Fathi, Dhahran (SA); Ki-Hyouk Choi, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 17/692,646

(22) Filed: Mar. 11, 2022

(51) Int. Cl.
| B01J 35/00 | (2006.01) |
| B01J 35/10 | (2006.01) |
| B01J 23/755 | (2006.01) |
| B01J 3/00 | (2006.01) |
| C10G 11/02 | (2006.01) |
| C10G 11/10 | (2006.01) |

(52) U.S. Cl.
CPC ............ *B01J 35/002* (2013.01); *B01J 3/008* (2013.01); *B01J 23/755* (2013.01); *B01J 35/1004* (2013.01); *C10G 11/02* (2013.01); *C10G 11/10* (2013.01); *C10G 2300/4006* (2013.01); *C10G 2300/4012* (2013.01); *C10G 2300/70* (2013.01)

(58) Field of Classification Search
CPC ........ B01J 3/008; B01J 23/755; B01J 35/002; B01J 35/1004; C10G 11/02; C10G 11/10; C10G 2300/4006; C10G 2300/4012; C10G 2300/70
See application file for complete search history.

(56) References Cited

U.S. PATENT DOCUMENTS

| 4,220,518 | A | 9/1980 | Uchida et al. |
| 4,647,367 | A | 3/1987 | Urban et al. |
| 9,409,160 | B2 | 8/2016 | Reitzmann et al. |
| 9,481,833 | B2 | 11/2016 | Maschmeyer |
| 9,505,678 | B2 | 11/2016 | Choi et al. |
| 9,902,908 | B2 | 2/2018 | Iversen |

(Continued)

FOREIGN PATENT DOCUMENTS

WO       1981000855 A1    4/1981

OTHER PUBLICATIONS

Bo, et al., Mass Transfer in a Flow Past a Non-Porous Catalyst Sphere, APS Division of Fluid Dynamics, Fall (2015), 1pg.

(Continued)

*Primary Examiner* — Brian A McCaig
(74) *Attorney, Agent, or Firm* — Bracewell LLP; Constance Gall Rhebergen (57) ABSTRACT

Apparatuses and methods of use are provided for a lobular catalyst for use in processes featuring water at high pressures and high temperatures, including in supercritical or near supercritical water conditions. The lobular catalyst structure features a shaped, plate-like structure extending along the reactor length with a high surface area. The lobular catalyst structure is fixed in place and mounted within a high temperature and high pressure reactor. The catalyst includes a catalytically active component, which can be a transition metal. The catalyst can be used in high pressure and high temperature processes, including in supercritical or near supercritical water processes, to improve heavy oil upgrading and hydrocarbon conversion in chemical processes.

17 Claims, 5 Drawing Sheets

(56) References Cited

U.S. PATENT DOCUMENTS

| | | |
|---|---|---|
| 9,951,283 B2 | 4/2018 | Choi et al. |
| 10,011,790 B2 | 7/2018 | Choi et al. |
| 10,106,748 B2 | 10/2018 | Choi et al. |
| 10,118,161 B2 | 11/2018 | Kester et al. |
| 10,137,436 B2 | 11/2018 | Osaki et al. |
| 10,703,999 B2 | 7/2020 | Choi et al. |
| 10,752,847 B2 | 8/2020 | Choi et al. |
| 10,927,312 B2 | 2/2021 | Choi et al. |
| 10,995,281 B2 | 5/2021 | Choi et al. |
| 2004/0192792 A1* | 9/2004 | Espinoza ............... B01J 23/63 518/716 |
| 2015/0259810 A1 | 9/2015 | Lewis et al. |
| 2018/0127659 A1 | 5/2018 | Schuetzle et al. |
| 2021/0031163 A1 | 2/2021 | Harp et al. |
| 2021/0031177 A1 | 2/2021 | Zhao et al. |
| 2021/0122629 A1 | 4/2021 | Robertson |

OTHER PUBLICATIONS

Davis, et al., A Non-Porous Supported-Platinum Catalyst for Aromatization of n-Hexane, Nature 349, Jan. 24, 1991, pp. 313-315 (1991).

Elnashaie, et al., Dynamic Behaviour and Stability of Non-Porous Catalyst Particles, Chemical Engineering Science, vol. 28, Issue 7, Jul. 1973, 2 pgs.

Phansalkar,SS, Characteristics of Catalyst Shapes and their Application to Hydrotreating, (Conference) OSTI (1987), Jan. 1, 1987, 3 pgs.

* cited by examiner

LOBULAR CATALYST STRUCTURE AND REACTOR FOR HYDROCARBON CONVERSION BY HOT AND COMPRESSED WATER BASED PROCESSES

FIELD

This disclosure relates apparatuses for a lobular-structured catalyst, and methods of use in a supercritical water based process. More specifically, this disclosure relates to methods of utilizing durable catalysts in high pressure and high temperature water-based processes.

BACKGROUND

Upgrading heavy hydrocarbons through catalytic processes is well-known in the art, but is limited in application. Catalysts provide active sites for cracking, isomerization, dealkylation, desulfurization, and demetallization of hydrocarbons, including heavy crudes. However, conventional catalytic processes have been unable to facility oil upgrading reactions under harsh conditions with extreme temperatures and pressures, such as high pressure and high temperature conditions, or in near-supercritical conditions for water, or supercritical water conditions. Dissolution, disintegration, and sintering of catalysts at these conditions is known in the art. Porous catalysts cannot be utilized at these conditions, as the pores are prone to plug under these conditions, and the porous structures cannot withstand the temperature and pressure conditions of high pressure and high temperature processes, especially those at or near conditions for supercritical water. Additionally, conventional catalysts in particulate form generate problems for high pressure processes and supercritical water systems, and removing degraded catalysts or fines is difficult and process-intensive. Therefore, the technical problem to be solved is providing a catalyst for high temperature and high pressure processes—including processes occurring in supercritical water reactors—that can upgrade hydrocarbons while maintaining the structural integrity and function of the catalysts.

SUMMARY

Apparatuses and methods of use are provided for a lobular catalyst for use in high pressure and high temperature processes utilizing water. The lobular catalysts can be used in a variety of chemical processes that involve water streams at high pressures and high temperatures, including in supercritical or near supercritical water conditions. The lobular catalyst is a shaped, plate-like structure with catalytically active materials on the surface of the structure, which can be interconnected and mounted in a reactor. The lobular catalyst has a high surface area. The catalyst includes a catalytically active component, which can be a transition metal. Other catalytically active components can be used, and additives can also be included. The catalyst can be used in high pressure and high temperature processes, including in supercritical or near supercritical water processes, and can be used to improve heavy oil upgrading and hydrocarbon conversion in chemical processes.

Disclosed herein is a lobular catalyst for use in hydrocarbon conversion in a reactor operating at high temperatures and high pressures utilizing water, including reactors that operate at high temperatures and high pressures or reactors designed to operate with high temperature and high pressure water streams. The lobular catalyst includes a catalyst structure that is a plate-structure, where the catalyst structure is a non-particulate, shaped plate-like structure. The catalyst structure has a cross section with a plurality of lobes and a hollow core, where each lobe includes an outward segment and an inward segment, where the outward segment and the inward segments having semi-ellipsoid cross sections. The lobular catalyst also includes a catalytically active component, where the catalytically active component is selected from group consisting of: Group 3 through Group 12 transition metals, and combinations of the same. The lobular catalyst is non-porous, and is operable to convert hydrocarbons in a reactor, as the lobular catalyst is operable to withstand a reactor operating pressure in the range of 0 barg to 800 barg and a temperature in the range of 1° C. to 1200° C., alternately 300° C. to 1200° C., alternately 373° C. to 1200° C., alternately 1° C. to 900° C., alternately 300° C. to 900° C., alternately 373° C. to 900° C., alternately 1° C. to 600° C., alternately 300° C. to 600° C., and alternately 373° C. to 600° C.

The catalytically active component includes nickel. In some embodiments, the catalytically active component includes one or more catalytically active transition metals. In some embodiments, the catalyst structure is made entirely of a catalytically active transition metal. The lobular catalyst is mounted in a fixed position within the reactor. The lobular catalyst includes 5 lobes. The lobular catalyst includes a high surface area. In some embodiments, the catalyst structure includes a ceramic support structure. In some embodiments, the reactor is a supercritical water reactor operable to process hydrocarbons at or near the supercritical conditions of water. In some embodiments, the pressure of the reactor is in the range of 200 barg to 500 barg and the temperature of the reactor is in the range of 1° C. to 600° C., alternately in the range of 250° C. to 500° C. In some embodiments, the supercritical water reactor operates at a pressure equal to or greater than 220 barg and at a temperature equal to or greater than 373° C. The lobular catalyst is operable to withstand the conditions of the supercritical water reactor in the absence of structural degradation over an operational time.

Also disclosed herein is a method of converting hydrocarbons in a reactor operating at high temperatures and high pressures utilizing the lobular catalyst, the method including the step of introducing a water stream to the reactor. The lobular catalyst is mounted within the reactor, and is operable to provide active sites facilitating upgrading reactions for hydrocarbons. The method also includes the steps of introducing a hydrocarbon feed to the reactor, and reacting the hydrocarbon feed with the water stream, generating a product. The product is an upgraded hydrocarbon. The method can also include the steps of removing the product from the reactor, and separating the product in a separator, which generates a light product and a heavy product. The method can also include the steps of heating the hydrocarbon feed prior to introduction into the reactor to a temperature in the range of 100° C. to 350° C., alternately 100° C. to 200° C., and pressurizing the hydrocarbon feed prior to introduction into the supercritical water reactor to a pressure in the range of 2,500 psig to 5,000 psig, alternately 2,500 psig to 4,000 psig. The water stream is at or near supercritical water conditions. In some embodiments, the reactor is a supercritical water reactor operable to process hydrocarbons at or near supercritical conditions of water. In some embodiments, the hydrocarbon feed is fed through the reactor in an upward flow. Other embodiments allow for a parallel reactor installed in parallel to the reactor, where the parallel reactor is operable to allow for a continuous carbon deposit removal.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

In the accompanying Figures, similar components or features, or both, can have a similar reference label. For the purpose of the simplified schematic illustrations and descriptions of FIGS. 1A through 4, the numerous temperature and pressure sensors, controllers, and the like that can be employed and well known to those of ordinary skill in the art are not included. Further, accompanying components that are in conventional industrial operations are not depicted. However, operational components, such as those described in the present disclosure, can be added to the embodiments described in this disclosure.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

When used herein, "at or near supercritical water conditions," "at, near, or above supercritical water conditions," "at or near conditions of supercritical water," "at, near, or above conditions of supercritical water," and similar phrases refer to those pressures and temperatures at the critical conditions of water, pressures and temperatures less than those for the critical conditions of water but within 50° C. and 10 bar of the critical conditions of water, and those conditions at or above critical conditions of water.

Apparatuses and methods of use are provided for a lobular catalyst for use in a reactor operating at high pressures and high temperatures, utilizing water at high pressures and high temperatures. The lobular catalyst features rounded lobes in a semi-ellipsoid shape resulting in a high surface area, and maximizing the surface area available for reactions while minimizing the total space utilized by the lobular catalyst structure within the reactor. The lobular catalyst includes 2 to 5 lobes. In a preferred embodiment, the lobular catalyst features 5 lobes, which optimizes the surface area while preventing coke and solids deposition. The lobular catalyst does not contain more than 5 lobes, as the addition of more lobes results in higher coke and solids deposition due to the narrow curvature. The lobular catalyst structure is a non-particulate, meaning that it is not in a particulate form, does not include particle shapes, and is not loaded into the reactor in a bed fashion. Instead, the lobular catalyst is a shaped, plate-like structure, formed as solid structures filling the reactor in specifically formed slab-like structures. The lobular catalyst structure is fixed in place and mounted within a reactor. The catalyst includes a catalytically active component, which can be a transition metal. The catalyst can be used in high pressure and high temperature water processes, including in supercritical water processes, to improve heavy oil upgrading and hydrocarbon conversion in chemical processes. The catalysts facilitate steam reforming reactions producing hydrogen, and provide active sites for cracking, isomerization, dealkylation, desulfurization, demetallization, among other reactions. In some embodiments, the reactor is a supercritical water reactor, which is designed to utilize water and operate at or near supercritical water conditions. The supercritical water reactor is a reactor operating at pressures and temperatures at, near, or above supercritical conditions of water. Supercritical water, which herein refers to water at or near supercritical water conditions, is utilized within the supercritical water reactor.

Advantageously, the present disclosure provides apparatuses and methods for increasing hydrocarbon upgrading and conversion, including for oil and heavy hydrocarbons. The structure and configuration of the non-porous, high surface area lobular catalyst structure allows for the use of catalyst within the reactor, even at high pressures and high temperatures, and even with the utilization of high temperature and high pressure water within the reactor. Advantageously, the high temperatures and high pressures of the water within the reactor minimize the combination reactions of condensed polyaromatic hydrocarbon radicals through the caging effect, which allows for additional time to completed other, more favored reactions.

Conventional catalysts are unable to withstand the harsh conditions of reactors utilizing water at high temperatures and high pressures, especially those at or near the supercritical conditions of water. Conventional catalysts become unstable under these harsh conditions, and can experience dissolution, disintegration, sintering, or other degradation in these conditions. Specifically, heterogeneous catalysts with catalytically active metal particles supported over substrates of alumina, silica, zeolite, or other types of supports are subject to disintegration in reactors utilizing water at high temperatures and high pressures, due to the high pressure, temperature, and water dissolution effect. Homogeneous catalysts with organometallic compounds can be inactivated in conditions where high pressure and high temperature water is used, including supercritical water conditions. Conventional catalyst particulates sinter under the high temperature and pressure, can become trapped within the product oil, and are difficult to separate from the product, resulting in difficulty in meeting product specifications such as conductivity and sedimentation measures. The trapped particulates can also cause erosion or corrosion of process lines and equipment, and can settle in downstream equipment, such as valves, instruments, and process lines, resulting in potential blockages and interference. Removing, separating, recovering, and recycling the conventional particulate catalyst is also difficult, especially after sintering, and requires additional processes and equipment.

The lobular catalyst structure can sustain the harsh conditions of the reactor over an operational period, without suffering from dissolution, disintegration, or sintering, and exhibits high mechanical and structural integrity and strength. The operational period can be from 15 to 25 years with continuous regeneration of the catalyst. The operational period can be dependent upon the quantity of particulates in the feedstock to the reactor. Particulates in the feedstock can result in erosion of the lobular catalyst structure surface. Higher particulate quantities can result in higher erosion of the lobular catalyst surfaces. In some embodiments, strainers, screen, or other trap devices can be installed upstream of the lobular catalyst reactor to capture particulates and prevent the introduction of particulates into the reactor. Advantageously, the use of the lobular catalyst in the reactor can increase the heavy oil conversion by 25% to 45% in comparison to supercritical catalytic processes utilizing other forms of catalysts, and product selectivity can be improved to target specific fractions within the product.

The shape and structure of the lobular catalyst maximizes surface area, allowing for increased contact time between the hydrocarbons, the high pressure and high temperature water, and active catalyst sites. The unique shape of the lobular catalyst minimizes the potential for coke and solids depositions. The hollow core of the lobular catalyst exposes the interior of the catalyst, increasing the surface area substantially. The thin walls of the catalyst also increase the available surface area, while the shape prevents coke and solids depositions even on the interior of the hollow core. In some preferred embodiments, 5 lobes are provided on the lobular catalyst structure, reducing the coke and solids depositions.

The present disclosure can be utilized in all flow regimes (laminar and non-laminar), and for Newtonian and non-Newtonian feed. In some embodiments, the feed flows through the reactor in an upward flow, maximizing the contact between the feed and the catalyst. The lobular catalyst structure can extend through the entire reactor length, or alternately, the entire reactor width. In some embodiments, the reactor can be between 2 to 15 meters in length.

The catalyst present in the lobular catalyst structure facilitates the reactions occurring within the reactor under the conditions present. These reactions include upgrading reactions, which convert heavy oil to lighter products. The catalyst improves the conversion and product selectivity by facilitating reactions such as cracking, alkylation, dehydrocyclization, cyclization, reforming, aromatization, hydrogenation, hydrocracking, steam reforming, water gas shift, and polymerization. Reactions can be influenced by the catalyst active sites and the operating conditions. In some embodiments, additional hydrogen is introduced to the reactor. The additional hydrogen improves hydrogenation and hydrocracking reactions in the present of the catalyst.

Figure 1A:
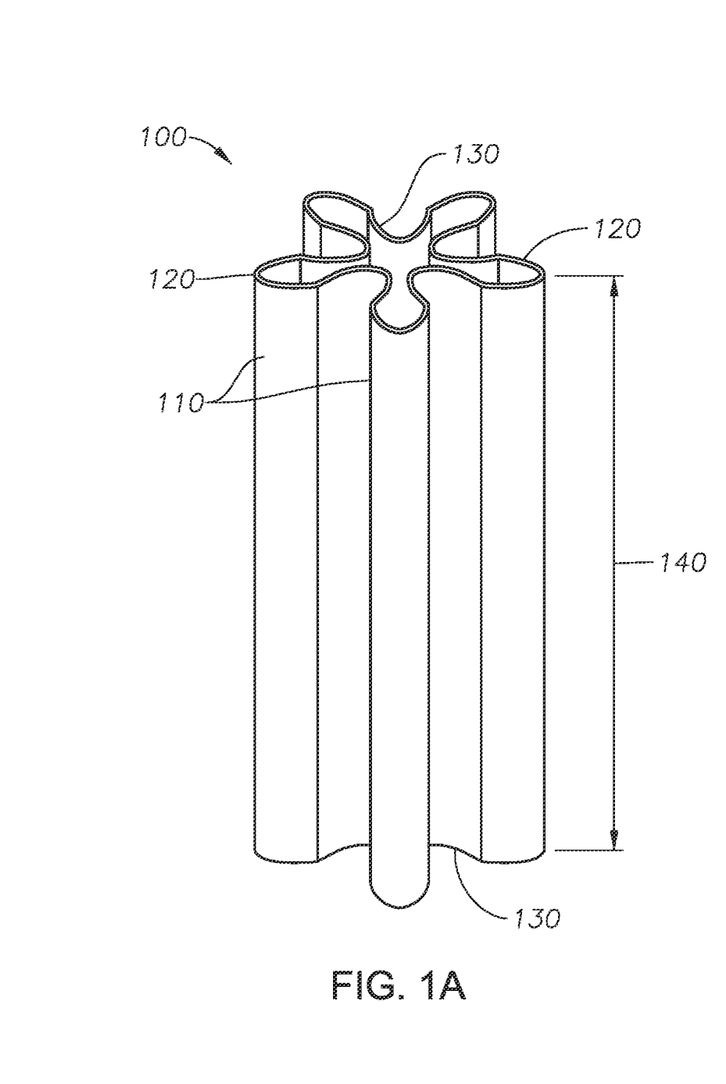
FIG. 1A is a depiction of a lobular catalyst structure, according to an embodiment.

Referring to FIG. 1A, lobular catalyst structure 100 is shown. Lobular catalyst structure 100 includes five lobes 110, and is hollow. Each lobe 110 includes outward segment 120 and inward segment 130. Outward segment 120 and inward segment 130 are semi-ellipsoids.

Lobular catalyst structure 100 has height 140. Lobular catalyst structure 100 is not a particulate, and is instead developed on a macro-scale, in a shaped plate-like or slab-like structure, formed with a specific cross-section. Lobular catalyst structure 100 can be formed like a shaped tube, with an outer wall and a hollow core. Lobular catalyst structure 100 does not include a porous material. In some embodiments, height 140 approximates the height of the widest or tallest portion of the reactor in which lobular catalyst 100 is installed. In some embodiments, height 140 substantially fills the reactor.

Figure 1B:
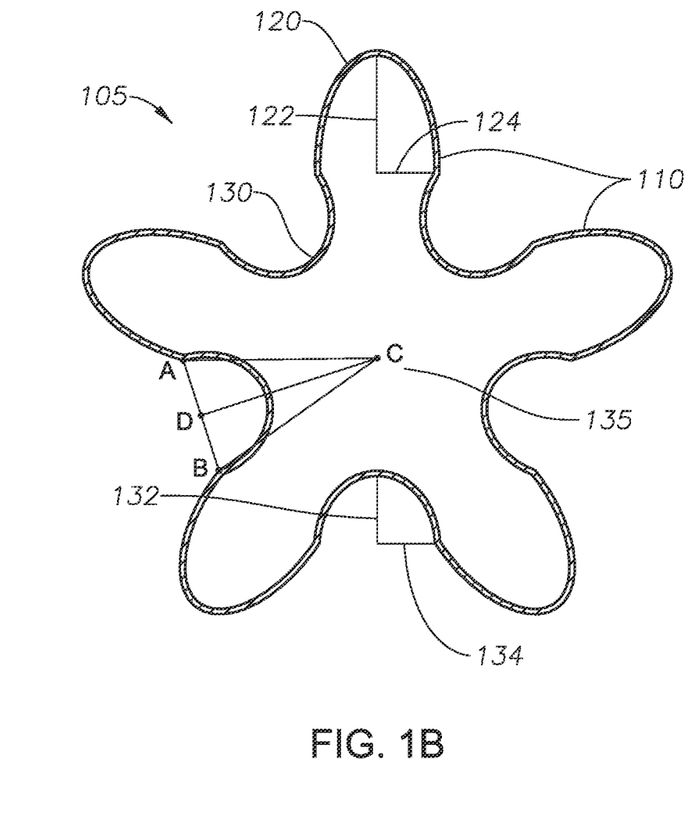
FIG. 1B is a depiction of a cross-section of the lobular catalyst structure, according to an embodiment.

Referring to FIG. 1B, cross section 105 of lobular catalyst structure 100 is shown. Lobular catalyst structure 100 is hollow. Hollow core 135 is an aperture through lobular catalyst structure 100 for height 140. Point C is the center point of cross section 105. Outward segment 120 includes outward major radius 122 and outward minor radius 124. Inward segment 130 includes inward major radius 132 and inward minor radius 134. Point A is located at the inflection point where inward segment 130 and outward segment 120 meet. Point B is located directly across from point A on the opposite side of inward segment 130, similarly situation at the inflection point where inward segment 130 and outward segment 120. Point D is the midpoint on the line between point A and point B. In some embodiments, the outward radius ratio of outward major radius 122 to outward minor radius 124 is in the range of 1.5 to 2. In some embodiments, the inward radius ratio of inward major radius 132 to inward minor radius 134 is in the range of 1.5 to 2. In some embodiments, the outward radius ratio and the inward radius ratio are the same. In some embodiments, outward major radius 122 and outward minor radius 124 are the same length. In some embodiments, inward major radius 132 and inward minor radius 134 are the same length. The lower the radii ratios, the lower the coke and solids depositions on the catalyst will be. The higher the radii ratios, the higher the surface area to total catalyst size will be. In preferred embodiments, the outward and inward major and minor radii lengths are optimized to minimize coke and solids deposition while maximizing the surface area of the catalyst.

The total volume of lobular catalyst structure can be approximated by the volume of a regular cyclic equilateral segment polygon when the outward segments 120 and inward segments 130 have similar dimensions. Referring back to FIG. 1A, the volume can be approximated by the Equation 1:

$$V = 5AB * DC * h \qquad \text{Eq. 1}$$

Where V is the volume, AB is the distance between points A and B, where A and B are points located opposite of one another across from inward segment 130, where A and B are further located at the inflection point where inward segment 130 and outward segment 120 intersect; DC is the distance between points D and C, where C is the center point of cross section 105 of lobular catalyst structure 100 and D is the midpoint of the distance AB, such that DC is the distance between the center of cross section 105 of lobular catalyst structure 100 and the midpoint between two adjacent inflection points between outward segment 120 and inward segment 130 that passes through inward major radius 132; and h is the length of height 140.

The unique shape of lobular catalyst structure 100 can provide substantial increases in surface area per volume as compared to the surface area per volume of a comparable cylinder, and therefore provides greater reaction rates. In some embodiments, the surface area per volume of lobular catalyst structure 100 is greater than 2 times the surface area per volume of a comparable cylindrical shape. Advantageously, the shape of lobular catalyst structure 100 minimizes carbons and solids deposition.

Lobular catalyst structure 100 includes a non-porous catalyst with a catalytically active material. In some embodiments, the catalytically active material includes metals. In preferred embodiments, lobular catalyst structure 100 includes Group 3 through Group 12 transition metals, their alloys, and combinations of the same. In more preferred embodiments, the transition metal includes Fe, Ni, Pt, Mo, their alloys, and combinations of the same. In one embodiment, nickel alloys are used. The nickel alloys can include HASTELLOY-C® of Haynes Stellite Company and INCONEL® 625 of International Nickel Company Inc. Lobular catalyst structure 100 can include additives, such as aluminum, silicone, boron, gallium, indium, bismuth, carbon, calcium, sodium, and potassium. The catalytically active material can be selected based upon the concentration of corrosive or erosive materials in the feedstock or the operation conditions of the reactor to avoid possible deformation and thermal degradation. In some embodiments where the feedstock has high concentrations of corrosive materials such as chloride and sulfur, the catalytically active material include platinum. In preferred embodiments, the selection of the catalytically active material is based upon simultaneously maximizing catalytic activity and resistance to corrosion.

Lobular catalyst structure 100 can be fully comprised of metals, or can have a support structure. In some embodiments, the metals are cladded onto ceramic support structures. In other embodiments, metallic support structures are provided. In yet other embodiments, lobular catalyst structure 100 includes a composition gradient, such that the surface of the catalyst is enriched with one component while the interior features higher concentrations of another component.

The thickness of the catalytically active materials, metals, or support structures of lobular catalyst structure 100 can be selected based upon feedstock properties, estimated corrosion rates, estimated erosion rates, and other factors. The weight of the metals or support structure of lobular catalyst structure 100 can similarly be selected based upon feedstock properties, estimated corrosion rates, estimated erosion rates, and other factors. Feedstocks containing corrosive materials or erosive particulates require thicker metallic layers. Additionally, the thickness of the metals or support structure of lobular catalyst structure 100 can be altered in consideration of deformation and thermal degradation, including melting and cracking cause by thermal expansion and contraction. In some embodiments, the thickness of the metals is based upon the corrosion resistance of the metals and the operational period of lobular catalyst structure 100.

Figure 2A:
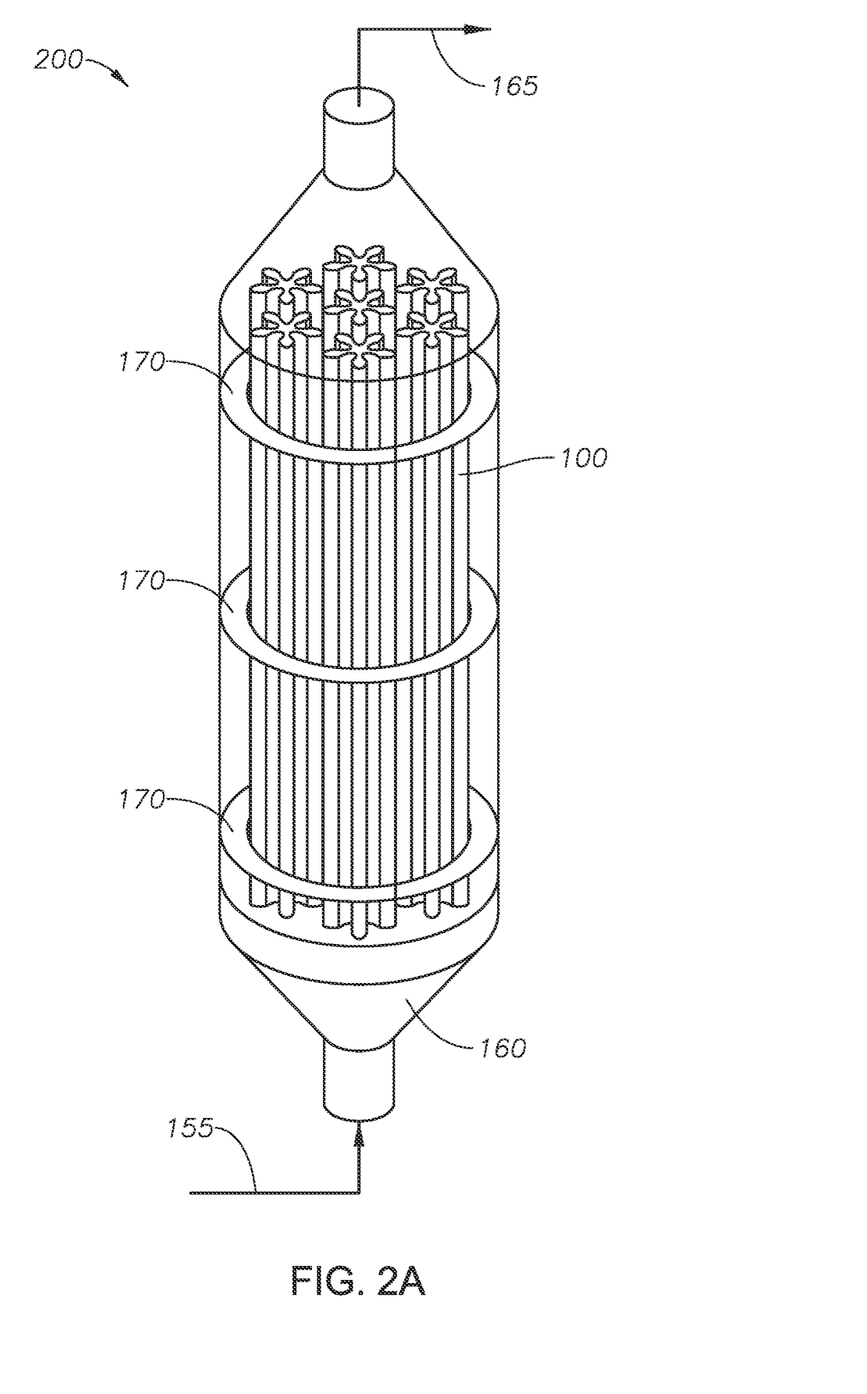
FIG. 2A is a depiction of the lobular catalyst reactor, according to an embodiment.

Referring to FIG. 2A, reactor 200 is shown. Reactor 200 can be any type of reactor capable of processing feed and water at high pressures and high temperatures. In some embodiments, reactor 200 is a supercritical water reactor, which operates at or near supercritical water conditions. Reactor 200 can be operated at a variety of process conditions. Reactor 200 can be operated at a temperature in the range of 1° C. to 900° C., alternately in the range of 300° C. to 900° C., alternately in the range of 373° C. to 900° C., alternately in the range of 1° C. to 600° C., alternately in the range of 300° C. to 600° C., alternately in the range of 373° C. to 600° C., alternately in the range of 120° C. to 500° C., alternately in the range of 250° C. to 500° C., and alternately in the range of 200° C. to 450° C. In some embodiments, reactor 200 is operated at, near, or above temperatures corresponding to the critical point of water. Additional heating can be provided within reactor 200. Reactor 200 can be operated at vacuum pressures. Reactor 200 can be operated at pressures ranging from 0 barg to 800 barg, alternately in the range of 1 barg to 200 barg, alternately in the range of 200 barg to 500 barg, alternately in the range of 10 barg to 300 barg, and alternately in the range of 170 barg to 275 barg. In some embodiments, reactor 200 is operated at, near, or above pressures corresponding to the critical point of water. The lobular catalyst is non-porous, and is operable to convert hydrocarbons in a reactor, as the lobular catalyst is operable to withstand a reactor operating pressure in the range of the operating pressure of reactor 200, including the range of 0 barg to 800 barg. The lobular catalyst is operable to withstand a reactor operating temperature in the range of the operating pressure of reactor 200, and in the range of 1° C. to 1200° C., alternately 300° C. to 1200° C., alternately 373° C. to 1200° C., and alternately 1° C. to 900° C.

Lobular catalyst structure 100 is mounted within reactor 200 via mount 170. Mount 170 is a metal housing support fixed inside the inner walls of reactor 200 through screws, clamps, or similar mechanisms. The number of lobular catalyst structure 100 fixed within reactor 200 is dependent upon the size, mechanical capacity, and structural capacity of reactor 200. In some embodiments, lobular catalyst structure 100 occupies less than 25% of the total internal volume of reactor 200. In preferred embodiments, lobular catalyst structure 100 occupies less than 10% of the total internal volume of reactor 200. In some embodiments, the area of cross section 105 not including the area of hollow core 135 of lobular catalyst structure 100 occupies less than 15% of the total cross sectional area of reactor 200. In preferred embodiments, the area of cross section 105 not including the area of hollow core 135 of lobular catalyst structure 100 occupies less than 2% of the total cross sectional area of reactor 200. The distance between each lobular catalyst structure 100 can be determined based on the volume of reactor 200, feed 155, flow velocity, carbon deposition rate, and mount 170.

Feed 155 is introduced at the bottom of reactor 200, generating an upward flow through reactor 200. Feed 155 can include hydrocarbons, oil, heavy hydrocarbon oils, whole range crude oil, crude oil fractions, topped crude oil, residual oil, decant oil from fluid catalytic cracking, pyrolysis oil, steam cracking process stream, conventional refinery process streams, petrochemical plant process streams, hydrocarbons from gas to liquid processes, hydrocarbons from biomass liquefaction processes, hydrocarbons from coal liquefaction processes, hydrocarbons from plastics, combinations of the same, and any other hydrocarbon streams known in the art. Feed 155 also includes water. Surge sump 160 allows for feed 155 to accumulate and allows for equal distribution of feedstock throughout the internal and external areas of lobular catalyst structure 100. Feed 155 passes through reactor 200 and over the internal and external surfaces of lobular catalyst structure 100. Feed 155 undergoes reactions with water at high temperatures and high pressures. In some embodiments, feed 155 undergoes reactions at, near, or above supercritical water conditions. Product 165 is removed from reactor 200. Product 165 can include upgraded hydrocarbons. Upgraded hydrocarbons can include hydrocarbons that have been cracked into lighter products, or have otherwise been desulfurized, dealkylated, demetallized, or otherwise improved in quality. In embodiments where feed 155 includes heavy hydrocarbons, product 165 includes a greater percentage of lighter hydrocarbons.

In some embodiments, lobular catalyst structure 100 is conditioned by flowing water with a temperature between 350° C. to 500° C. and a pressure between 22 MPa to 30 MPa through reactor 200 before feed 155 is introduced. The conditioning removes any impurities attached to the surface of the catalyst and pre-conditions the catalysts to better withstand the harsh conditions of reactor 200.

Figure 2B:
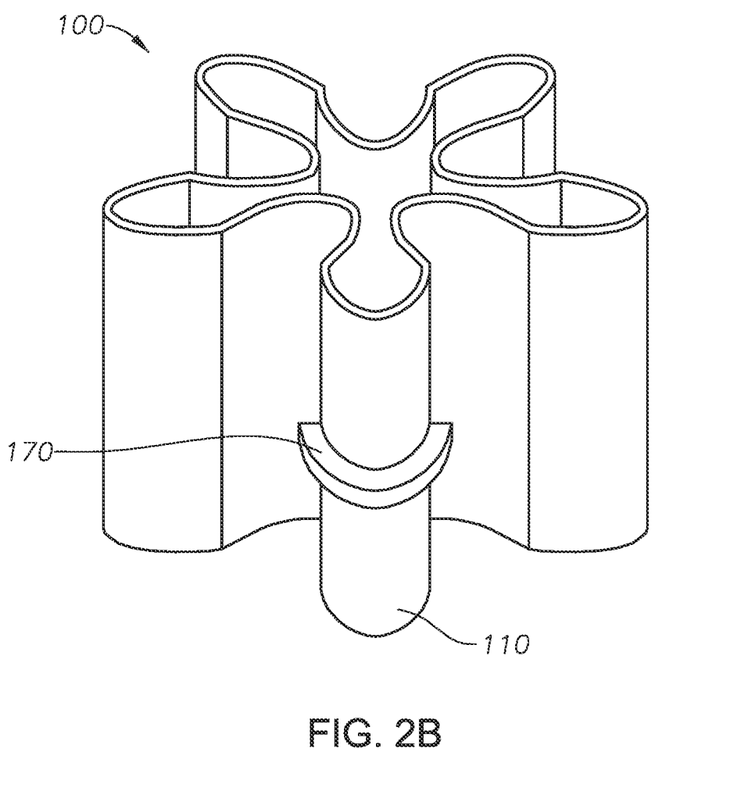
FIG. 2B is a depiction of a lobular catalyst structure with a mounting bracket, according to an embodiment.
Figure 2C:
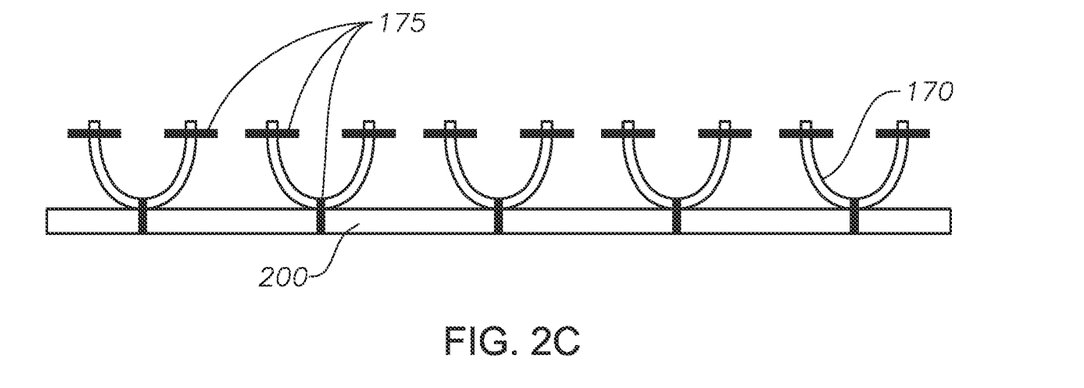
FIG. 2C is a depiction of a mounting bracket, according to an embodiment.

Referring to FIG. 2B, lobular catalyst structure 100 is shown with mount 170. Mount 170 is attached to lobe 110. Referring to FIG. 2C, mount 170 is shown. Mount 170 features screws 175 to attach mount 170 to lobe 110 of lobular catalyst structure 100 and the wall of reactor 200.

Screw 175 can be any type of mechanism operable to affix mount 170 to lobe 110 or the wall of reactor 200, including clamps. Preferably, thermal expansion of both lobular catalyst structure 100 and mount 170 are taken into consideration when sizing both lobular catalyst structure 100 and mount 170 for reactor 200 to prevent mechanical stress, cracks, bends, or other potential damage.

Figure 3:
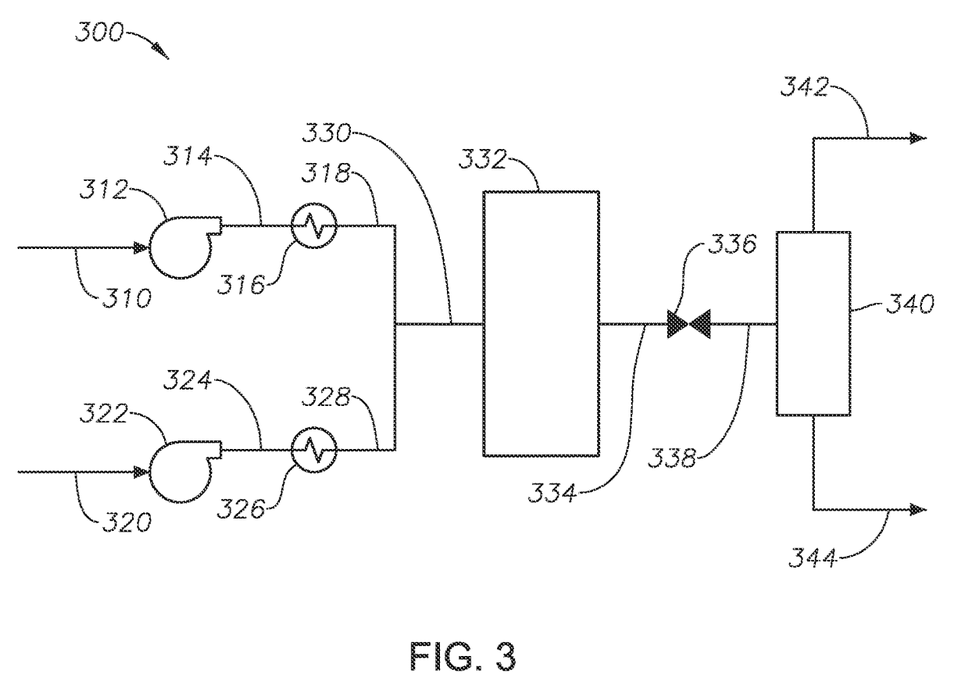
FIG. 3 is a process diagram of a supercritical water reactor process utilizing catalysts, according to an embodiment.

Referring to FIG. 3, supercritical water system 300 is shown. Water 310 is pressurized in water pump 312 generating pressurized water 314. Pressurized water 314 is heated in water heater 316, generating heated water 318. In some embodiments, heated water 318 is in subcritical water conditions. In other embodiments, heated water 318 is near or at supercritical water conditions. Pressurized water 314 can have a pressure in the range of 2,500 psig to 5,000 psig. Heated water 318 can have a temperature in the range of 300° C. to 600° C.

Hydrocarbon feed 320, which can share the same or similar characteristics as feed 155, is pressurized in feed pump 322, generating pressurized feed 324. Pressurized feed 324 is heated in feed heater 326 generating heated feed 328. In some embodiments, heated feed 328 is at temperatures and pressures near supercritical water conditions. Pressurized feed 324 has a pressure in the range of 2,500 psig to 5,000 psig. Heated feed 328 has a temperature in the range of 100° C. to 350° C.

Heated water 318 and heated feed 328 are mixed to form mixed stream 330. Mixed stream 330 is introduced to supercritical water reactor 332. Supercritical water reactor 332 can have the same or similar characteristics as reactor 200. Supercritical water reactor 332 can operate at or near supercritical water conditions. Supercritical water reactor 332 allows for reactions to occur between water at or near supercritical conditions for water and hydrocarbons, facilitated by the lobular catalyst. Product 334 is removed from supercritical water reactor 332. Product 334 can share the same or similar characteristics as product 165. Product 334 is depressurized in pressure reducer 336. Pressure reducer 336 can include any type of device capable of depressurizing product 334, including depressurizing valves. Pressure reducer 336 generates depressurized product 338. Depressurized product 338 is introduced into separator 340, which separates light products from heavy products. Separator 340 can be any type of separator operable to separate component products. Separator 340 generates light product 342 and heavy product 344. Heavy product 344 includes water. The water in heavy product 344 can be separated from heavy hydrocarbons in a separator (not shown). The heavy hydrocarbons from the separator can be recycled back to supercritical water reactor 332 by mixing with pressurized feed 324, or can be stored or further processed.

Figure 4:
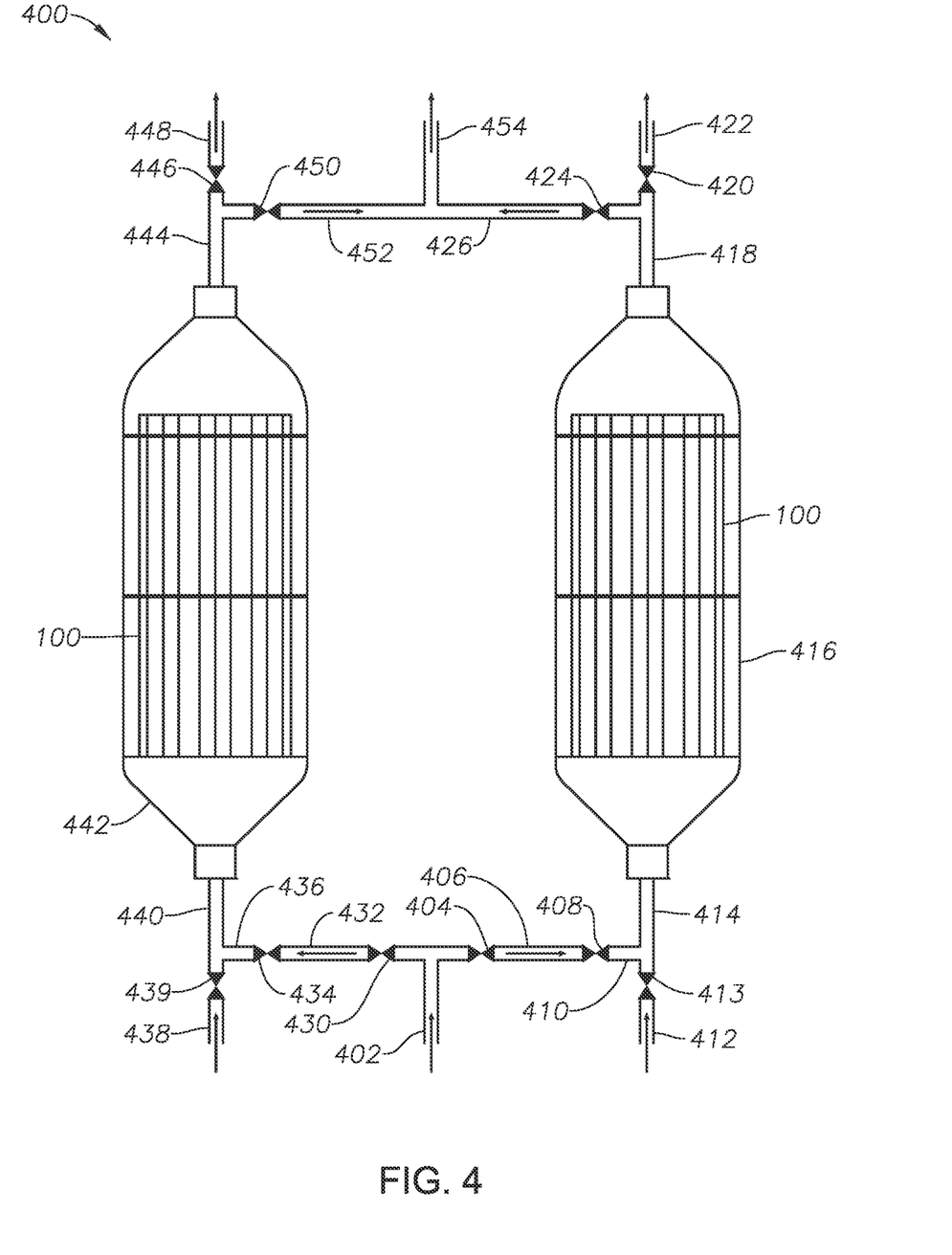
FIG. 4 is a process diagram of swing reactors to allow for continuous carbon removal process from the lobular catalysts inside the reactor, according to an embodiment.

Referring to FIG. 4, continuous carbon removal process 400 is shown, featuring an a system of swing reactors to allow for continuous carbon removal from the lobular catalyst structures inside the reactors utilizing an interconnected system of a first reactor and its associated streams and a second reactors and its associated streams. Continuous carbon removal process 400 allows for removal of carbon deposits and coke that can build up on the surfaces of lobular catalyst structure 100 without process interruption. When first valve 404 is open and feed is not diverted, stream 406 operates to provide mixed feed 402 to first reactor 416. However, when first reactor 416 is isolated via valve 404 and valve 424, the system can undergo carbon removal. In this process, mixed feed 402 is introduced in the process. Mixed feed 402 includes feed hydrocarbons and water. Mixed feed 402 can have the same or similar characteristics as mixed stream 330. While mixed feed 402 is diverted through second valve 430, valve 404 is closed, isolating first reactor 416. Valve 413 is opened, allowing first air stream 412 to enter first reactor 416 via stream 414. First air stream 412 includes heated air and steam. Stream 414 is prevented from mixing with feed 402 by first check valve 408. Stream 414 enters first reactor 416 containing lobular catalyst structure 100, which can have the same or similar characteristics as reactor 200, or supercritical water reactor 332. The hot air from first air stream 412 in stream 414 removes carbon and solid deposits from lobular catalyst structure 100. Stream 418 exits first reactor 416. When valve 424 is closed, and valve 420 is opened, flue gas 422 is removed from the system containing CO, $CO_2$, $SO_x$, and $NO_x$.

While first reactor 416 is undergoing regeneration, mixed feed 402 can still be treated in the second reactor system through second reactor 442, when valve 430 and valve 450 are open, and valve 439 and valve 446 are closed. Mixed feed 402 passes through open valve 430 generating stream 432. Stream 432 passes through check valve 434 and generates stream 436, which enters second reactor 442 as stream 440. Second air stream 438, which includes heated air and steam, is prevented from entering the system by a closed valve 439. Second reactor 442 contains lobular catalyst structure 100, which can have the same or similar characteristics as first reactor 416. Second product 444 is removed from second reactor 442, and can have the same or similar characteristics as product 334 and product 165, or the product generated from first reactor 416 when first reactor 416 is not undergoing regeneration. Second product 444 is prevented from exiting through second flue gas stream 448 by closed valve 446. Second product 444 is passes through open valve 450, and exits through stream 452 and stream 454.

When lobular catalyst structure 100 of first reactor 416 has been regenerated, valve 413 and 420 can be closed, and first valve 404 and valve 424 can be opened, allowing mixed feed 402 to enter first reactor 416. When second reactor 442 is regenerated, second valve 430 and valve 450 can be closed, and valve 439 and valve 446 can be opened, so that second air stream 438 can be introduced to second reactor 442. Second air stream 438 includes heated air and steam. In this way, continuous treatment of the mixed feed 402 can be performed while the catalyst in each reactor is regenerated.

EXAMPLE

The following computer model comparative example was generated based upon supercritical water system 300. In one model, a non-catalytic supercritical water process was used as a base line for comparison. In a second model, a catalytic supercritical water process was used. The results are shown in the tables below.

Hydrocarbon feed 320 included a reduced crude oil having an API gravity of 12.7. Water 310 was a demineralized water having conductivity less than 0.1 μS/cm². Water pump 312 functions at 100 L/hr. Pressurized water 314 has a pressure of 3,600 psig. Heated water 318 has a temperature of 500° C. Pressurized feed 324 has a pressure of 3,600 psig. Heated feed 328 has a temperature of 120° C. Supercritical water reactor 332 operates at a temperature of 450° C. to allow for cracking and other conversion reactions. Depressurized product 338 has a pressure of about 1 atm.

Composition and properties of hydrocarbon feed 320 and product 334 for the non-catalytic supercritical water process is shown in Table 1.

TABLE 1

Hydrocarbon Feed 320 and Product 334 Properties for
Non-Catalytic Supercritical Water Processes

| Properties | | Hydrocarbon Feed (320) | Product (334) |
|---|---|---|---|
| Mass Flow (kg/hour) | | 49.0 | 48.1 |
| API Gravity (Degree) | | 12.7 | 19.8 |
| Distillation (TBP) | 5% | 362 | 297 |
| | 10% | 390 | 337 |
| | 30% | 468 | 420 |
| | 50% | 524 | 464 |
| | 70% | 588 | 519 |
| | 90% | 653 | 592 |
| | 95% | 673 | 632 |
| Total Sulfur Content (wt %) | | 4.0 | 3.7 |
| Viscosity (cSt) at 50° C. | | 640 | 89 |
| Asphaltene (Heptane-insoluble) | | 4.8 | 1.7 |
| Metals (V and Ni) (wtppm) | | 83 | 9 |

Composition and properties of hydrocarbon feed 320 and product 334 for the catalytic supercritical water process is shown in Table 2.

TABLE 2

Hydrocarbon Feed 320 and Product 334 Properties for
Catalytic Supercritical Water Processes

| Properties | | Hydrocarbon Feed (320) | Product (334) |
|---|---|---|---|
| Mass Flow (kg/hour) | | 49.0 | 47.1 (remaining is gas) |
| Specific Gravity (Degree) | | 12.7 | 26.2 |
| Distillation (TBP) | 5% | 362 | 258 |
| | 10% | 390 | 301 |
| | 30% | 468 | 378 |
| | 50% | 524 | 420 |
| | 70% | 588 | 468 |
| | 90% | 653 | 541 |
| | 95% | 673 | 571 |
| Total Sulfur Content (wt %) | | 4.0 | 1.4 |
| Viscosity (cSt) at 50° C. | | 640 | 27 |
| Asphaltene (Heptane-insoluble) | | 4.8 | 0.3 |
| Metals (V and Ni) (wtppm) | | 83 | 4 |

Variations between the mass flow of hydrocarbon feed 320 and product 334 can be accounted for in the gaseous phase.

The results of the example show that product 334 from the catalytic supercritical water process is lighter than product 334 from the non-catalytic supercritical water process.

The singular forms "a," "an," and "the" include plural referents, unless the context clearly dictates otherwise.

As used in the specification and in the appended claims, the words "has," "contains," and "include" and all grammatical variations thereof are each intended to have an open, non-limiting meaning that does not exclude additional elements or steps.

What is claimed is:

1. A lobular catalyst for use in hydrocarbon conversion in a reactor operating at high temperatures and high pressures utilizing water at high temperatures and high pressures, the lobular catalyst comprising:
   a catalyst structure, wherein the catalyst structure is a plate-structure, the catalyst structure having a cross section comprising a plurality of lobes and a hollow core, wherein each lobe comprises an outward segment and an inward segment, the outward segments and the inward segments having semi-ellipsoid cross sections; and
   a catalytically active component, wherein the catalytically active component is selected from group consisting of: Group 3 through Group 12 transition metals, and combinations of the same;
   wherein the lobular catalyst is non-porous;
   further wherein the lobular catalyst is operable to facilitate reactions of hydrocarbons in the reactor, the lobular catalyst operable to withstand a reactor operating pressure in the range of 0 barg to 800 barg and a reactor operating temperature in the range of 1° C. to 900° C.

2. The lobular catalyst of claim 1, wherein the catalytically active component comprises nickel.

3. The lobular catalyst of claim 1, wherein the catalyst structure consists of a catalytically active transition metal.

4. The lobular catalyst of claim 1, wherein the lobular catalyst is configured to be mounted in a fixed position within the reactor.

5. The lobular catalyst of claim 1, comprising 5 lobes.

6. The lobular catalyst of claim 1, wherein the lobular catalyst is configured to maximize surface area.

7. The lobular catalyst of claim 1, comprising a ceramic support structure.

8. A supercritical water reactor comprising the lobular catalyst of claim 1, the supercritical water reactor configured to process hydrocarbons at or near supercritical conditions for water.

9. The supercritical water reactor of claim 8, wherein the pressure of the supercritical water reactor is in the range of 200 barg to 500 barg and the temperature of the supercritical water reactor is in the range of 250° C. to 500° C.

10. The supercritical water reactor of claim 8, wherein the lobular catalyst is configured to withstand the conditions of the supercritical water reactor in an absence of structural degradation over an operational time.

11. A method of converting hydrocarbons in a reactor operating at high temperatures and high pressures utilizing the lobular catalyst of claim 1, the method comprising the steps of:
   introducing a water stream to the reactor, wherein the lobular catalyst of claim 1 is mounted within the reactor, wherein the lobular catalyst of claim 1 is operable to provide active sites facilitating upgrading reactions for hydrocarbons;
   introducing a hydrocarbon feed to the reactor; and
   reacting the hydrocarbon feed with the water stream, generating a product, wherein the product is an upgraded hydrocarbon.

12. The method of claim 11, further comprising the steps of: removing the product from the reactor; and separating the product in a separator.

13. The method of claim 11, further comprising the steps of:
   heating the hydrocarbon feed prior to introduction into the reactor to a temperature in the range of 100° C. to 350° C.; and
   pressurizing the hydrocarbon feed prior to introduction into the reactor to a pressure in the range of 2,500 psig to 5,000 psig.

14. The method of claim 11, wherein the water stream is at or near supercritical water conditions.

15. The method of claim 11, wherein the reactor is a supercritical water reactor operable to process hydrocarbons at or near supercritical conditions for water.

16. The method of claim 11, wherein the hydrocarbon feed is fed through the reactor in an upward flow.

17. The method of claim 11, wherein a parallel reactor is installed in parallel to the reactor, the parallel reactor operable to allow for a continuous carbon deposit removal.

\* \* \* \* \*